(12) United States Patent
Hanks et al.

(10) Patent No.: US 8,853,474 B2
(45) Date of Patent: *Oct. 7, 2014

(54) HYDROPROCESSING OF BIOCOMPONENT FEEDSTOCKS WITH LOW PURITY HYDROGEN-CONTAINING STREAMS

(75) Inventors: Patrick L. Hanks, Annandale, NJ (US); Edward S. Ellis, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1039 days.

This patent is subject to a terminal disclaimer.

(21) Appl. No.: 12/836,771

(22) Filed: Jul. 15, 2010

(65) Prior Publication Data

US 2011/0155636 A1 Jun. 30, 2011

Related U.S. Application Data

(60) Provisional application No. 61/284,955, filed on Dec. 29, 2009.

(51) Int. Cl.
| | | |
|---|---|---|
| C07C 1/00 | (2006.01) | |
| C10G 3/00 | (2006.01) | |
| C10L 1/02 | (2006.01) | |
| C10G 45/02 | (2006.01) | |
| C10G 45/58 | (2006.01) | |

(52) U.S. Cl.
CPC ........ C10G 45/02 (2013.01); C10G 2300/4018 (2013.01); Y02E 50/13 (2013.01); C10G 2300/701 (2013.01); C10G 3/50 (2013.01); C10G 2300/1011 (2013.01); C10G 2300/207 (2013.01); C10L 1/026 (2013.01); C10G 2400/04 (2013.01); C10G 3/46 (2013.01); C10G 45/58 (2013.01)
USPC .............................. 585/240; 585/242; 208/60

(58) Field of Classification Search
USPC ........ 585/240, 242; 44/605; 208/108, 111.35, 208/209, 60
See application file for complete search history.

(56) References Cited

U.S. PATENT DOCUMENTS

| | | | |
|---|---|---|---|
| 5,075,629 A | 12/1991 | Umemura et al. | |
| 5,110,445 A | 5/1992 | Chen et al. | |
| 5,302,779 A | 4/1994 | Morel et al. | |
| 5,456,820 A | 10/1995 | Forbus, Jr. et al. | |
| 5,573,657 A | 11/1996 | Degnan et al. | |
| 5,723,716 A | 3/1998 | Brandes et al. | |
| 5,770,542 A | 6/1998 | Brandes et al. | |

(Continued)

FOREIGN PATENT DOCUMENTS

| | | |
|---|---|---|
| EP | 1 640 437 A1 | 3/2006 |
| EP | 1 719 811 A1 | 11/2006 |

(Continued)

*Primary Examiner* — Nina Bhat
(74) *Attorney, Agent, or Firm* — David M. Weisberg; Chad A. Guice (57) ABSTRACT

A biocomponent feedstock can be hydroprocessed using a hydrogen-containing refinery as a source of hydrogen gas. A relatively low cost catalyst, such as a water gas shift catalyst and/or spent hydrotreating catalyst, can be used as a hydrogenation catalyst for the process. The hydroprocessing can allow for olefin saturation and/or deoxygenation of the biocomponent feed by using a relatively low value refinery stream, e.g., containing from about 20 mol % to about 60 mol % hydrogen.

19 Claims, 5 Drawing Sheets

(56) References Cited

U.S. PATENT DOCUMENTS

| | | | |
|---|---|---|---|
| 5,977,425 A | 11/1999 | Brandes et al. | |
| 6,156,695 A | 12/2000 | Soled et al. | |
| 6,162,350 A | 12/2000 | Soled et al. | |
| 6,190,532 B1 | 2/2001 | Degnan et al. | |
| 6,299,760 B1 | 10/2001 | Soled et al. | |
| 6,582,590 B1 | 6/2003 | Riley et al. | |
| 6,712,955 B1 | 3/2004 | Hou et al. | |
| 6,783,663 B1 | 8/2004 | Riley et al. | |
| 6,863,803 B1 | 3/2005 | Riley et al. | |
| 6,929,738 B1 | 8/2005 | Riley et al. | |
| 7,077,947 B2 | 7/2006 | Cody et al. | |
| 7,087,152 B2 | 8/2006 | Cody et al. | |
| 7,125,818 B2 | 10/2006 | Cody et al. | |
| 7,220,350 B2 | 5/2007 | Cody et al. | |
| 7,229,548 B2 | 6/2007 | Riley et al. | |
| 7,282,137 B2 | 10/2007 | Cody et al. | |
| 7,288,182 B1 | 10/2007 | Soled et al. | |
| 7,410,924 B2 | 8/2008 | Corma Canos et al. | |
| 7,429,318 B2 | 9/2008 | Cody et al. | |
| 7,482,300 B2 | 1/2009 | Lai et al. | |
| 7,538,065 B2 | 5/2009 | McCarthy et al. | |
| 7,544,632 B2 | 6/2009 | Soled et al. | |
| 7,625,478 B2 | 12/2009 | Lai et al. | |
| 2006/0073961 A1 | 4/2006 | McCarthy et al. | |
| 2007/0084754 A1 | 4/2007 | Soled et al. | |
| 2007/0170091 A1* | 7/2007 | Monnier et al. | 208/15 |
| 2008/0132407 A1 | 6/2008 | Bai et al. | |
| 2008/0154073 A1 | 6/2008 | Petri et al. | |
| 2008/0161614 A1* | 7/2008 | Bertoncini et al. | 585/240 |
| 2008/0163672 A1 | 7/2008 | Wang et al. | |
| 2008/0171675 A1 | 7/2008 | Yeh et al. | |
| 2009/0082606 A1* | 3/2009 | Marker et al. | 585/733 |
| 2009/0163744 A1 | 6/2009 | Abhari et al. | |
| 2009/0166256 A1* | 7/2009 | Lewis et al. | 208/89 |

FOREIGN PATENT DOCUMENTS

| | | |
|---|---|---|
| EP | 1 728 844 A1 | 12/2006 |
| EP | 1 741 767 A1 | 1/2007 |
| EP | 1 741 768 A1 | 1/2007 |
| EP | 1 396 531 B1 | 3/2007 |
| EP | 1 693 432 B1 | 9/2009 |
| EP | 1 681 337 B1 | 12/2010 |
| WO | 2004/007646 A1 | 1/2004 |
| WO | 2004/022674 A1 | 3/2004 |
| WO | 2006055670 A2 | 5/2006 |
| WO | 2007/084437 A2 | 7/2007 |
| WO | 2007/084438 A3 | 7/2007 |
| WO | 2007/084439 A1 | 7/2007 |
| WO | 2007/084471 A1 | 7/2007 |
| WO | 2008/020048 A2 | 2/2008 |
| WO | 2008/040980 A1 | 4/2008 |

\* cited by examiner

HYDROPROCESSING OF BIOCOMPONENT FEEDSTOCKS WITH LOW PURITY HYDROGEN-CONTAINING STREAMS

CROSS-REFERENCE TO RELATED APPLICATIONS

This application claims the priority benefit of U.S. Application No. 61/284,955, filed Dec. 12, 2009.

FIELD

Systems and processes are provided for hydrotreatment of biocomponent feeds using a relatively low value refinery stream as a hydrogen source.

BACKGROUND

Fuels based on biocomponent sources will likely become increasingly prevalent in the future. Already, various governments have instituted current and future requirements that motor fuel pools contain a minimum percentage of fuel derived from a biocomponent source, such as a plant, animal, fish, or algae-based oil or fat.

Producing diesel fuel from biocomponent sources also presents a variety of challenges. In particular, for diesel hydroprocessing units that operate at low pressures, the presence of the additional heteroatoms in a biocomponent based diesel feed may pose difficulties. Modifying and/or replacing low pressure units to allow for higher processing pressures would require expensive capital investment.

For production of diesel fuel, vegetable oils such as canola oil, palm oil, or other similar oils have been identified as potentially suitable based on the carbon chain length of the vegetable oil. While some progress has been made toward stand alone processing and/or co-processing of biocomponent feeds, improvements to allow efficient processing in a refinery setting are greatly desired.

U.S. Patent Application Publication No. 2008/0154073 describes a process for removing oxygen from biocomponent molecules at low hydrogen pressure. The feed in this reference is exposed to a supported hydrogenation catalyst, such as Ni, NiMo, Pt, or Pd, in the presence of 150-290 psi hydrogen.

U.S. Patent Application Publication No. 2008/0161614 describes two stage co-processing of a feed including both vegetable/animal and mineral oil. According to this disclosure, the first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

International Publication No. WO 2008/040980 describes reducing hydrogen consumption by controlling the products from reactions to remove oxygen from biocomponent feeds. Lower hydrogen pressures are mentioned as helping to reduce hydrogen consumption, but such pressures are mentioned as also leading to catalyst deactivation.

International Publication No. WO 2008/020048 describes a process for production of normal alkanes by hydrotreating mixtures of triglycerides or free fatty acids with vacuum gasoil. Conventional hydrotreatment catalysts are used in this process, which takes place at relatively mild conditions including a reaction pressure below 100 bars.

European Patent No. EP 1719811 describes a method for producing liquid hydrocarbons from biomass. The method includes forming an aqueous slurry of the biomass and particles of a layered catalyst, such as a clay. The slurry is heated to a temperature of 250-400° C. Up to 10 bars of hydrogen may optionally be added, although the publication indicates a preference to perform the process without added hydrogen.

European Patent No. EP 1741767 describes a process for producing diesel fuel from biocomponent sources. This reference states that the process reduces the needed hydrogen consumption by adding sulfur-containing compound to the biocomponent feed.

European Patent No. EP 1693432 describes co-processing of vegetable oils with various diesel type mineral refinery feeds. The method appears to include combining vegetable oil and mineral oil, hydrotreating the combined oil, and stripping off gas phase products.

SUMMARY

One aspect of the invention relates to a method for hydroprocessing a biocomponent feedstock to form a diesel boiling range product, comprising: treating a purge gas and/or an off-gas stream from an existing refinery reactor to remove hydrogen sulfide and carbon dioxide, the treated refinery stream having a hydrogen content from about 20 mol % to about 60 mol %, for example from about 25 mol % to about 50 mol %; and hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

Another aspect of the invention relates to a method for hydroprocessing a biocomponent feedstock to form a diesel boiling range product, comprising: treating a purge gas and/or an off-gas stream from an existing refinery reactor to remove hydrogen sulfide and carbon dioxide, the treated refinery stream having a hydrogen content from about 25 wt % to about 50 wt %; and hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

DETAILED DESCRIPTION OF THE EMBODIMENTS

In many refineries, availability of hydrogen can be a limiting factor in how hydrocarbons are processed. A refinery typically generates some hydrogen during processing of a crude feed, such as during reforming of gasoline. This hydrogen can then be used to meet the hydrogen needs in the refinery, such as for hydroprocessing. Providing hydrogen from a separate, outside source in a refinery will often raise costs to a point that is not economical. Thus, when a new process is added in a refinery that requires hydrogen, the addition can often require a reduction in volume in another process.

Processing of biocomponent feedstocks to make fuel products such as diesel fuel can present such a hydrogen consumption problem in a refinery. Biocomponent feeds typically consume much higher amounts of hydrogen than a mineral feed having a similar boiling range. For example, removal of oxygen and saturation of aromatic bonds in a biocomponent feed could require up to about 5-7 times as much hydrogen as would be needed to hydrotreat a comparable mineral feed for sulfur and nitrogen removal. In such situations, each barrel of biocomponent feed processed by a refinery could require a reduction of as much as about 5-7 barrels in the amount of mineral fuel (diesel) that is processed.

One option for overcoming the hydrogen consumption problem is to identify another refinery stream that can serve as a hydrogen source for treatment of a biocomponent feed. This option can minimize or avoid the need to reduce production of another product in order to treat the biocomponent feed.

Additionally or alternately to effectively utilizing hydrogen resources, there may be an economic driver to use other refinery resources in such a way as to improve and/or maximize their effectiveness. For instance, at least partially spent catalyst can be reused and/or existing reactors, particularly those reactors having a lower pressure capacity than desired, can be re-used in the present invention to improve and/or maximize the output efficiency of an already-constructed refinery.

In various embodiments, the invention allows a biocomponent feed to be hydrotreated with an alternative hydrogen source in order to remove the majority (i.e., more than 50% by weight) of the oxygen in the feed, and possibly substantially all (e.g., at least 95% by weight, preferably at least 98% by weight, for example at least 99% by weight, at least 99.5% by weight, at least 99.9% by weight, at least 99.95% by weight, at least 99.97% by weight, at least 99.98% by weight, at least 99.99% by weight, at least 99.995% by weight, or completely all) of the oxygen in the feed. Examples of relatively low value refinery streams that can be used as a hydrogen source for hydroprocessing the biocomponent feed can include, but are not limited to, purge streams from relatively low pressure treat gas circuits, off-gas (scrubbed or unscrubbed) from atmospheric distillate oil (or automotive diesel oil or ADO) units, purge gas or off-gas from certain hydrotreating and/or reforming units (e.g., kerosene hydrotreater, jet fuel hydrotreater, cat feed hydrotreater, distillate hydrotreater, naphtha hydrotreater, naphtha pretreater, SCANfiner, GOfiner, ultraGOfiner, residfiner, or the like, or combinations thereof), purge gas or off-gas from non-FCC hydrocrackers, or the like, or combinations thereof. Alternately, purge gas or off-gas from a fluid catalytic cracking (FCC) unit can be used as the hydrogen source.

Thus, the hydrogen feed for the reaction can be a gas stream that would normally be diverted in a refinery to a lower value use, such as service as a fuel gas. By making use of a relatively low value hydrogen-containing feed, the hydrogen needed for removing oxygen from a biocomponent feed need not be at the expense of performing another existing refinery process. The costs for this process can be further reduced by using a relatively low cost water gas shift catalyst, such as $Fe_3O_4$, as the hydrotreatment catalyst. After processing, the resulting biocomponent product may be suitable for use, e.g., in the diesel fuel pool. Alternately, the biocomponent product can be mixed with a conventional mineral (diesel) feed, e.g., which can include a second hydrotreatment step. However, because the majority of the oxygen should be removed in a dedicated process, the co-processing of the biocomponent product with a mineral feed should typically have a reduced or minimized amount of catalyst suppression/deactivation problems.

In some embodiments, one of the benefits of the invention is the ability to use a relatively low value refinery source (effluent stream) to treat a new type of refinery feed. The oxygen content in a biocomponent feed can create a variety of problems in a refinery. The oxygen content can be as high as about 10-12% by weight, meaning that a large amount of hydrogen may be needed to remove the oxygen by a hydrogenation type reaction. Biocomponent feeds can also have a tendency to suppress hydrodesulfurization (HDS) activity, making co-processing of a biocomponent feed challenging. However, the oxygen removal reaction can occur under relatively mild conditions and typically will not require relatively harsh conditions. Thus, a relatively low activity hydrogenation catalyst not only can be sufficient but may also be desirable to catalyze the hydrodeoxygenation (HDO) reaction. Similarly, relatively low hydrogen partial pressures can often be sufficient to perform HDO. By using a relatively low cost catalyst and a relatively low value refinery stream for an initial processing step, the invention allows for production of a biocomponent based (diesel) product at reduced expense and with little or no significant impact on other refinery resources. In particular, significant amounts of hydrogen may not need to be diverted from another refinery operation for use in deoxygenating a biocomponent feed.

In various embodiments, a system and method are provided for hydroprocessing a biocomponent feed. The system and method can include providing a hydrotreatment reactor for processing of a biocomponent feed. The catalyst for the hydrotreatment reactor can be a relatively low cost water gas shift catalyst that also has sufficient hydrogenation activity. The hydrogen source for is the hydrotreatment reaction can advantageously include and/or be a relatively low value refinery stream containing hydrogen. Steam can also be introduced into the reactor to further facilitate hydrogen production via a water gas shift reaction. The hydrotreatment process can result in an effluent including a vapor product, a diesel boiling range product, and an aqueous product. Optionally, the diesel boiling range product can be co-processed with a mineral feed in a second hydrotreatment reactor. Optionally, the diesel boiling range product can be isomerized to improve the cold-flow properties.

In still other embodiments, the hydrogen in the relatively low value hydrogen-containing refinery stream can be supplemented with hydrogen from the main refinery hydrogen supply. In such embodiments, at least a portion of the hydrogen can be provided from the relatively low value refinery stream, thus reducing the amount of hydrogen needed from the primary supply.

Feedstocks

The feedstock can include varying amounts of feedstreams based on biocomponent sources. When desired, the feed can include at least about 0.1 wt % of feed based on a biocomponent source, for example at least about 0.5 wt %, at least about 1 wt %, at least about 3 wt %, at least about 10 wt %, or at least about 15 wt %. In such embodiments, the feed can include about 60 wt % or less of biocomponent, for example about 50 wt % or less, about 40 wt % or less, or about 30 wt % or less. In other embodiments, the amount of biocomponent feed (e.g., for co-processing with the mineral oil portion of the feed) can be relatively small, for instance with a feed that includes at least about 0.5 wt % of feedstock based on a biocomponent source, e.g., at least about 1 wt %, at least about 2.5 wt %, or at least about 5 wt %. In such embodiments, the feed can include about 20 wt % or less of biocomponent based feedstock, for example about 15 wt % or less, about 10 wt % or less, or about 5 wt % or less.

As used herein, a "biocomponent feedstock" refers to a hydrocarbon feedstock (typically also containing some oxygen atoms) derived from a biological raw material component, such as vegetable fats/oils and/or animal fats/oils (including algae and fish fats/oils, respectively). Note that for the purposes of this document, vegetable fats/oils refer generally to any plant based material, and include fat/oils derived from a source such as plants from the genus *Jatropha*. Biocomponent feedstocks usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Optionally but preferably, the feed can comprise a blend of a mineral oil feedstock with a biocomponent feedstock. By "mineral oil" feedstock is meant a fossil/mineral fuel source, such as crude oil, and not the commercial organic product, such as sold under CAS number 8020-83-5, e.g., by Aldrich. In the discussion below, a biocomponent feedstock refers to a hydrocarbon feedstock derived from a biological raw material component, from biocomponent sources such as vegetable, animal, fish, and/or algae. Generally, these biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, to coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material is include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

Biocomponent based diesel boiling range feedstreams can typically have low nitrogen and sulfur content. For example, a biocomponent based feedstream can contain up to about 300 parts per million by weight (wppm) nitrogen (in the form of nitrogen-containing compounds). Instead of nitrogen and/or sulfur, the primary heteroatom component in biocomponent based feeds is oxygen (in the form of oxygen-containing compounds). Suitable biocomponent diesel boiling range feedstreams can include up to about 10-12 wt % oxygen. In preferred embodiments, the sulfur content of the biocomponent feedstream can advantageously be about 15 wppm or less, preferably about 10 wppm or less, although, in some embodiments, the biocomponent feedstream can be substantially free of sulfur (e.g., can contain no more than 50 wppm, preferably no more than 20 wppm, for example no more than 15 wppm, no more than 10 wppm, no more than 5 wppm, no more than 3 wppm, no more than 2 wppm, no more than 1 wppm, no more than 500 wppb, no more than 200 wppb, no more than 100 wppb, no more than 50 wppb, or completely no measurable sulfur).

In some embodiments, a mineral diesel boiling range feed can be mixed with the biocomponent feed, e.g., prior to treatment with the relatively low value refinery stream in the presence of a hydrogenation catalyst, preferably a relatively low value catalyst such as a water gas shift catalyst, a spent hydrotreating catalyst, and/or a regenerated hydrotreating catalyst. In such embodiments, the relatively low value catalyst should preferably be selected from catalysts that have a higher sulfur resistance. Due to the increased sulfur content in typical mineral oil feeds, an $Fe_3O_4$ catalyst can rapidly be converted to some type of iron sulfide. Iron sulfides tend to have low activity for promoting hydrogenation type reactions. In such embodiments, the mineral feed can preferably be a lighter distillate feed, such as a kerosene, jet, or light gas oil feed.

When utilized, the mineral oil feedstocks that are co-processed with the biocomponent feedstock can have an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), or at least about 350° F. (about 177° C.). Additionally or alternately, the feedstock can be characterized by the boiling point required to boil a specified percentage of the feed. For example, the temperature required to boil at least 5 wt % of a feed is referred to as a "T5" boiling point. In one embodiment, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F. (about 399° C.) or less or about 725° F. (about 385° C.) or less.

Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. In some embodiments, the mineral stream for blending with the biocomponent stream can be a diesel boiling range stream. In other embodiments, the mineral stream can be a higher boiling range stream, such as an atmospheric or vacuum gas oil. In still other embodiments, the mineral stream can be a lower boiling range stream, such as a heavy naphtha, a virgin naphtha stream, or an other virgin distillate. Other examples of suitable mineral streams can include resid, cycle oils (e.g., light cycle oil), and coker derived oils, as well as combinations of any of these and/or any of the other aforementioned streams.

In one embodiment, the mineral feedstream for blending with the biocomponent feedstream can advantageously have relatively low nitrogen and sulfur content. Preferably, the mineral feedstream can be a finished diesel stream having a sulfur content of not more than about 50 wppm (preferably not more than about 30 wppm, for example not more than about 15 wppm, not more than about 10 wppm, or not more than about 5 wppm) and a nitrogen content of not more than about 50 wppm (preferably not more than about 30 wppm, for example not more than about 15 wppm, not more than about 10 wppm, or not more than about 5 wppm).

Gas Feeds

In various embodiments, a hydrogen source for hydroprocessing of the biocomponent feedstock can be a relatively low value refinery stream, e.g., containing 60 mol % hydrogen or less. Such refinery streams are considered of relatively low value because they have conventionally been seen as having too low of a hydrogen purity and/or too high a content of undesirable components to be used in most refinery processes. This results mostly in such refinery streams being upgraded (e.g., by separating out a higher value component for recycle and/or reuse, by separating out a lower value and/or particularly troublesome component and recycling and/or reusing the remaining components, or the like, or combinations thereof), being treated (e.g., to convert one or more lower value and/or particularly troublesome components of the refinery stream into one or more higher value components), being burned for fuel gas (typically for generating heat, e.g., to assist with temperature control of endothermic refinery reactions), and/or a combination thereof. Aside from hydrogen, such relatively low value refinery streams can typically also contain light side products and by-products, which can include, but are not limited to carbon oxides, light ends, water, hydrogen sulfide, ammonia, and the like, and combinations thereof. The light ends generally represent a mix of low carbon number hydrocarbons, e.g., alkanes such as methane and ethane. As the desired products from certain refinery reactors are fractionated, separated, or distilled out, these light (generally gaseous) products can form a purge gas or off-gas. For example, FCC off-gas is conventionally viewed as having several problems, including having a relatively low pressure with a relatively low $H_2$ concentration (e.g., having a total stream pressure of about 50 psig (345 kPag), possibly up to about 100 psig (690 kPag), and a $H_2$ concentration of less than 25 mol %). Substantial pressure uplift would be needed for FCC off-gas to achieve hydrogen partial pressures typically indicative of hydrotreatment. Additionally, as CO is a known suppressing agent for hydrotreatment reactions, increased CO content of $H_2$-containing gas streams can tend to reduce the overall hydrotreatment activity.

However, instead of using such low hydrogen content gas streams as fuel sources, various embodiments of the invention can allow such gas streams to serve as a hydrogen source for hydroprocessing of a biocomponent feed. Both olefin saturation ($C^=$ sat) and HDO can occur at relatively mild conditions, with olefin saturation being the more facile reaction. Thus, even the relatively low $H_2$ content of such refinery streams may be sufficient for the reaction. Additionally, where CO is present in the refinery stream in measurable concentrations, even though CO may at least partially suppress the activity of the catalyst, the activity can preferably remain high enough to sufficiently deoxygenate the biocomponent feed (e.g., to remove the majority of the oxygen in the feed, and possibly to remove substantially all of the oxygen in the feed).

Upon entering the hydrotreating reactor according to the present invention, the hydrogen-containing gas can typically have a hydrogen content of less than about 60 mol %. In various embodiments, the hydrogen content of the gas stream can be about 55 mol % or less, about 50 mol % or less, about 45 mol % or less, about 40 mol % or less, or about 35 mol % or less, based on the total moles of gas in the stream. Additionally or alternately, the hydrogen content of the relatively low value refinery gas stream can be at least about 20 mol %, for example at least about 25 mol %, at least about 30 mol %, at least about 35 mol %, or at least about 40 mol %, based on the total moles of gas in the stream—however, hydrogen contents of at least about 80 mol %, based on the total moles of gas in the stream, are traditionally seen as relatively high value, and not as relatively low value, hydrogen-containing gas streams.

Typical refinery streams useful according to this invention, aside from containing hydrogen gas, can additionally include one or more of light ends, CO, $CO_2$, $H_2S$, and $NH_3$. Other components may also be possible, depending on the feed chemistry and/or conditions of the reactor from which the refinery stream originated. Such a hydrogen-containing gas can be used directly as a hydrogen source for HDO of a biocomponent feed according to the invention. However, in some embodiments, the hydrogen-containing gas stream can be scrubbed prior to use, particularly when the catalyst being used for the hydrotreating reaction is particularly sensitive to components present in the hydrogen-containing gas (e.g., if the gas stream contains $H_2S$, then it should be scrubbed prior to contacting with a sulfur-sensitive catalyst such as those comprising a Group VIII noble metals like Pt and/or Pd, whereas scrubbing of $H_2S$-containing gas streams would be optional when contacting a sulfur-robust catalyst such as a conventional Group VIB/VIII hydrotreating catalyst, whether fresh, spent, regenerated, or rejuvenated). Scrubbing of the hydrogen-containing gas stream can reduce (preferably significantly) the concentration of $H_2S$ and/or $CO_2$ in the gas stream. An example of a suitable scrubber is an amine tower, which can use, e.g., diethylamine (DEA) or methylamine to capture $H_2S$ and $CO_2$. Note that CO is typically not removed in substantial amounts by this type of scrubber.

As noted above, in certain situations, significant removal of $H_2S$ can be beneficial for maintaining the activity/reactivity of the catalyst. Preferred water gas shift catalysts according to the invention include predominantly transition metal oxides, such as iron, chromium, copper, zinc, and combinations thereof. In the presence of $H_2S$, at least a portion of the catalyst may convert to sulfide(s), which can tend to be less desirable for certain catalysts such as water gas shift catalysts in the various embodiments of the invention. In some embodiments, scrubbing the relatively low value hydrogen-containing streams can result in a significant reduction in sulfur content, e.g., corresponding to a concentration of sulfur compounds of 15 vppm or less, for example 10 vppm or less. In certain embodiments, the scrubbed hydrogen-containing gas streams can preferably have an $H_2S$ concentration of less than 50 vppm.

Upon entering the hydrotreating reactor according to the present invention, the hydrogen-containing gas can preferably have a $CO_2$ content not to exceed 10 mol %, for example not to exceed about 7 mol %, not to exceed about 5 mol %, not to exceed about 3 mol %, not to exceed about 1 mol %, not to exceed about 5000 ppm, not to exceed about 3000 ppm, or not to exceed about 1000 ppm. In situations such as where the gas stream $CO_2$ content exceeds these levels, removal of $CO_2$ can be beneficial, e.g., for increasing the amount of hydrogen produced in situ in the reactor. The water gas shift reaction approximates an equilibrium process, where $H_2O$ and CO can be reversibly reacted to form $H_2$ and $CO_2$, i.e., $H_2O + CO \leftrightharpoons H_2 + CO_2$.

Because this resembles an equilibrium process, an increase in one of the participating species in the reaction can tend to drive the reaction to reduce that concentration. Thus, providing an excess of $CO_2$ can tend to drive this reaction to form more $H_2O$ and CO. Since $H_2$ is a desired product from this reaction, reducing the $CO_2$ level should enhance the amount of $H_2$ produced via the water gas shift reaction.

The production of $H_2$ can be further enhanced by introducing steam into the reactor during a hydroprocessing step. Steam provides additional water as a reactant, which can help drive the formation of additional $H_2$. In some embodiments where steam is added, it may be possible to reduce the amount of steam addition once the hydrotreatment process is started, as deoxygenation of the biocomponent feed can often lead to some water production.

Catalyst

In various embodiments, hydroprocessing can be performed in the presence of a relatively low cost catalyst, such as a water gas shift catalyst. Water gas shift activity is typically beneficial for producing additional hydrogen (and $CO_2$) from $H_2O$ (and CO) in the off-gas and/or in the reactor.

A preferred water gas shift catalyst includes an oxide of iron, such as $Fe_3O_4$. Iron oxides with water gas shift activity may be advantageous. Other water gas shift catalysts that also have hydrogenation activity can include supported catalysts such as ZnO and/or CuO, e.g., supported on alumina, iron oxide catalysts promoted with $CrO_2$, or the like, or combinations thereof. Water gas shift catalysts can advantageously be exposed to a reducing environment prior to use. Because biocomponent feeds typically have low sulfur contents, the catalysts should be able to maintain activity (e.g., HDO activity) for a reasonable amount of processing time (e.g., from about 6 months to about 10 years, preferably from about 1 year to about 5 years, for instance from about 18 months to about 4 years).

More generally, suitable catalysts can include those comprising one or more Group VIII metals and one or more Group VIB metals, for example comprising Ni and/or Co and W and/or Mo, preferably comprising a combination of Ni and Mo, or Co and Mo, or a ternary combination such as Ni, Co, and Mo or such as Ni, Mo, and W. The or each hydrotreatment catalyst can be a bulk catalyst or can be supported on an oxide such as alumina, silica, zirconia, titania, or a combination thereof, or another known support material such as carbon. Such catalysts are well known for use in hydrotreatment and hydrocracking.

A NiMo catalyst is preferably used to initiate olefin saturation at a to lower inlet temperature. Most units are constrained by a maximum operating temperature, and large amounts of heat are released from treatment of biofeeds. Initiating olefin saturation at lower temperature with NiMo allows for longer cycle lengths (as the maximum temperature will be reached later) and/or permits processing of more biofeeds.

A CoMo catalyst can preferably be used for lower hydrogen partial pressure desulfurization and to slow down the kinetics of biofeed treatment. Spreading the exotherm out throughout the process by having such a lower activity catalyst can advantageously reduce the number of hotspots (which can decrease in efficiency of the unit, and potentially give rise to structural issues if near reactor walls). At high hydrogen partial pressures, the use of CoMo may also reduce the amount of methanation (e.g., $CO + 3H_2 \rightarrow CH_4 + H_2O$ and/or $CO_2 + 4H_2 \rightarrow CH_4 + 2H_2O$) that occurs, which can help to reduce hydrogen consumption.

One option could be to use a spent conventional hydrotreating catalyst (e.g., NiMo and/or CoMo). Such catalyst(s) tends to have a reduced activity for conventional hydrotreatment processes (such as HDS and/or HDN), but may still have sufficient activity for olefin saturation and/or HDO. Hydrotreating catalysts such as NiMo and/or CoMo can be preferred in certain situations, e.g., where the biocomponent feed may be blended with a sulfur-containing mineral feed prior to hydrogen-containing gas exposure in the hydrotreatment reactor.

Another option could be to use a spent conventional hydrotreating catalyst that has been regenerated (mere reactivation of catalytically active sites) and/or rejuvenated (reactivation of catalytically active sites in combination with additional deposition of relevant metals so as to approximate the hydrotreatment activity of fresh catalyst). Though this option is possible, it is less preferred, as the regeneration and/or rejuvenation process(es) add significant expense to the process. Similarly, while fresh conventional hydrotreating catalyst, having relatively high catalytic activity in hydrotreatment, is yet another possibility, it is even less preferred than using regenerated and/or rejuvenated catalyst, as there is an additional incremental increase in cost in using such active catalysts.

As used herein, the terms "CoMo" and "NiMo" refer to catalysts comprising molybdenum and either cobalt or nickel, respectively, as catalytic metals. While sometimes fabricated as oxides, such catalysts are typically sulfided to exhibit hydrotreatment activity. Whether in oxide or sulfided form, such catalysts may also optionally include supports and minor amounts of other materials such as promoters. By way of illustration, such hydrotreating catalysts are described, for example, in one or more of U.S. Pat. Nos. 6,156,695, 6,162, 350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia. Suitable hydrotreating catalyst can also be obtained commercially, e.g., under the tradenames KF-848™, KF-841™, KF840™, KF-757™, RT-601™, RT-3™, and RT-2™ from Albemarle of Baton Rouge, La.; DN-3551™, DN-3531™, DN-3330™, and DN-200™ from Criterion of Houston, Tex.; TK-576™ from Haldor-Topsoe of Houston, Tex.; HR-626™ from Axens of Houston, Tex.; and the like.

Aside from conventional hydrodesulfurization/hydrodenitrogenation catalysts, such as CoMo and/or NiMo, the hydrodeoxygenation and hydrogenation (olefinic and/or aromatic saturation) can additionally or alternately be accomplished using fresh, regenerated and/or rejuvenated, or spent hydroisomerization/dewaxing catalyst. Such hydroisomerization/dewaxing catalysts can include molecular sieves having a $SiO_2:Al_2O_3$ ratio of 100 or less, for example 80 or less or 60 or less, optionally but preferably including a metal oxide binder. Non-limiting examples can include, but are not limited to, EU-1, zeolite beta, ZSM-35, ZSM-11, ZSM-57, NU-87, ZSM-22, EU-2, EU-11, ZBM-30, ZSM-48, ZSM-23, or a combination thereof, preferably zeolite beta, ZSM-48, and/or ZSM-23. In certain embodiments, the molecular sieves can have a ratio of sieve (zeolite) surface area to external surface area of at least 80:100, for example at least 90:100 or at least 105:100. When present, it can be preferable for the metal oxide binder, in powder form, to have a surface area of 100 $m^2$/g or less, for example 80 $m^2$/g or less or 60 $m^2$/g or less and/or to comprise at least one of silica, alumina, titania, and zirconia. Additionally or alternately, if desired, the hydroisomerization/dewaxing catalyst can also comprise a promoter metal selected from the metals of Group VIII of the Periodic Table of Elements. In embodiments where only a Group VIII metal is included that Group VIII metal is preferably noble, more preferably comprising Pt and/or Pd. In embodiments where an additional promoter metal is provided in addition to the Group VIII metal, the Group VIII metal can be Ni and/or Co (preferably Ni), and the additional promoter metal can comprise a Group VIB metal, such as Mo and/or W, preferably at least W. By way of illustration, such hydroisomerization catalysts are described, for example, in one or more of U.S. Pat. Nos. 5,075,629, 5,110,445, 5,302,779, 5,456,820, 5,573,657, 5,723,716, 5,770,542, 5,977,425, 6,190,532, 7,077,947, 7,087,152, 7,125,818, 7,220,350, 7,282,137, 7,429,318, 7,482,300, 7,538,065, and 7,625,478, and U.S. Patent Application Publication Nos. 2005/0113250, 2006/0073961, 2008/0163672, and 2008/0171675, inter alia.

Reaction Conditions

The biocomponent feedstock, optionally steam, and hydrogen-containing gas source can be introduced into a reactor containing a catalyst having water gas shift activity and/or another type of hydrogenation catalyst. The biocomponent feed can advantageously be exposed to the catalyst under conditions effective for removing oxygen from the feed. In some embodiments, the conditions can be effective for removing substantially all of the oxygen. In alternative embodiments, the conditions can be effective for removing at least 50 wt % of the oxygen, for example at least 80 wt %, at least 85 wt %, or at least 90 wt %. In such alternative embodiments, the conditions can typically be effective for removing 99 wt % or less of the oxygen, for example 98 wt % or less or 95 wt % or less. In such alternative embodiments, the processed biocomponent feed can be mixed with a mineral diesel boiling range feed and may be co-processed in a hydrotreatment reactor to further remove oxygen from the biocomponent feed.

In situations where the biocomponent feed is exposed to the catalyst, optional steam, and hydrogen-containing gas source, the conditions can be effective for saturating olefins and/or removing oxygen from the feed. The conditions can include an LHSV from about 0.1 $hr^{-1}$ to about 10 $hr^{-1}$, for example from about 0.5 $hr^{-1}$ to about 1.5 $hr^{-1}$, and a weight average bed temperature (WABT, abbreviated herein as "temperature") from about 550° F. to about 700° F. (about 288° C. to about 371° C.), for example from about 575° F. to about 675° F. (about 302° C. to about 357° C.) or from about 600° F. to about 650° F. (about 315° C. to about 343° C.). Note that the temperature range can represent a balancing of hydrogenation activity for oxygen removal and water gas shift activity. Conversion of CO and $H_2O$ into $CO_2$ and $H_2$ is an exothermic process. Because the water gas shift reaction also resembles an equilibrium process, increases in temperature can tend to drive the reaction toward CO and $H_2O$ formation.

Due to the nature of the refinery stream(s) used as the hydrogen source, there can be several alternatives for treat gas rate and reaction pressure. For instance, a typical FCC off-gas can generally have a pressure from about 50 psig to about 100 psig (about 345 kPag to about 690 kPag). In some embodiments, a pump can be used to increase the pressure of the FCC off-gas feed to a higher value, such as about 300 psig to about 400 psig (about 2.1 MPag to about 2.8 MPag). Since the FCC off-gas can generally comprise about 15% to about 20% hydrogen by volume, its hydrogen partial pressure can roughly be about 50 psig to about 80 psig (about 345 kPag to about 552 kPag). In other embodiments, the FCC off-gas can be used at the pressure generated as an output from the FCC reactor. In still other embodiments, the FCC off-gas can be used at a pressure from about 50 psig to about 400 psig (about 345 kPag to about 2.8 MPag). In any of these embodiments, or in embodiments where other refinery streams are used as a source of hydrogen, the hydrogen in the refinery stream can optionally be supplemented with one or more other hydrogen streams of higher purity, e.g., to increase the partial pressure of hydrogen in the reactor, and thus to increase the olefin saturation and/or HDO activity.

In general, the total reactor pressure in the hydroprocessing reactor according to the present invention can be from about 100 psig (about 690 kPag) to about 600 psig (about 4.1 MPag), for example from about 150 psig (about 1.0 MPag) to about 300 psig (about 2.1 MPag) or from about 150 psig (about 1.0 MPag) to about 250 psig (about 1.7 MPag). Also, because there are other components besides hydrogen in the hydrogen-containing gas stream, the hydrogen partial pressure can generally be quite different from the total reactor pressure. Indeed, often in reactors containing biocomponent feeds, the hydrogen partial pressure is expressed as the partial pressure of hydrogen in the hydrogen-containing gas at the inlet to the hydroprocessing reactor; however in reactors containing only mineral feeds, the hydrogen partial pressure can generally be expressed as the partial pressure of hydrogen at the outlet of the hydroprocessing reactor. In one embodiment, the hydrogen partial pressure (inlet) can be at least about 10 psig (about 69 kPag), for example at least about 15 psig (about 100 kPag), at least about 30 psig (about 210 kPag), at least about 40 psig (about 280 kPag), at least about 50 psig (about 345 kPag), at least about 60 psig (about 410 kPag), at least about 70 psig (about 480 kPag), or at least about 80 psig (about 550 kPag). Additionally or alternately, the hydrogen partial pressure (inlet) can be about 350 psig (about 2.4 MPag) or less, for example about 300 psig (about 2.1 MPag) or less, about 250 psig (about 1.7 MPag) or less, about 200 psig (about 1.4 MPag) or less, about 150 psig (about 1.0 MPag) or less, or about 100 psig (about 690 kPag) or less.

In embodiments involving a co-current reactor, the relatively low hydrogen partial pressure can be partially accommodated by increasing the amount of hydrogen-containing gas used relative to the amount of biocomponent feed. As a practical matter, a typical refinery will generally have existing reactors that generate a purge gases and/or off-gases at a given flow rate. Depending on the size of the relevant reactor, the hydrogen-containing gas flow rate could be from about 500,000 scf/day to about 50,000,000 scf/day (about 14,000 Sm$^3$/day to about 1.4 Skm$^3$/day). The amount of biocomponent feed processed using the hydrogen-containing gas stream can be adjusted to yield a desired treat gas ratio of hydrogen source to biocomponent feed. For example, an FCC unit generating about 20,000,000 scf/day (about 0.57 Skm$^3$/day) of off-gas could be used to treat about 2000 barrels (bbl) per day of a biocomponent feed. This would roughly correspond to a treat gas ratio of about 10,000 scf/bbl (about 1700 Nm$^3$/m$^3$) for the total feed, and a hydrogen treat gas ratio of about 1500 scf/bbl to about 2000 scf/bbl (about 250 Sm$^3$/m$^3$ to about 340 Sm$^3$/m$^3$), based on an off-gas hydrogen content of about 15-20% by volume.

In some embodiments, some portions of the reaction can be performed in a counter-current reactor. In such a situation, the direction of flow for the biocomponent feed during processing would be opposite from the direction of flow for the hydrogen-containing gas stream. When present, steam may also typically flow in the opposite direction from the biocomponent feed during counter-current operation. In embodiments including a counter-current reactor, the feed can enter the reactor at the top, while the hydrogen-containing gas and steam flows can enter at the bottom. As the gas travels up the reactor, it can typically become depleted of hydrogen, generally leading to lower hydrogen partial pressures near the top (outlet) of the reactor. One advantage of this counter-current scheme can be that the lowest hydrogen partial pressures can encounter the feed when it first enters the reactor. The lower partial pressure of hydrogen should be sufficient to saturate olefins within the biocomponent feed, leaving the higher hydrogen pressure at the bottom of the reactor to effectuate HDO.

Another potential advantage of a counter-current design can be the ability to modify the temperature profile across the reactor, e.g., to enhance hydrogen production via water gas shift. In the water gas shift reaction, production of hydrogen (and CO$_2$) from water and CO is exothermic. Thus, decreasing the temperature in the reaction environment can cause the water gas shift equilibrium to favor more hydrogen production. In an embodiment, the temperature can be varied within the counter-current reactor so that lower reaction temperatures are found near the top of the reactor and so that higher reaction temperatures are found near the bottom.

The reaction can produce up to three types of effluent streams (or more). One type of stream can include a vapor effluent stream. The vapor effluent can include unreacted H$_2$, any CO and/or CO$_2$, water vapor, light ends, and any other light products, e.g., that may have been introduced to the reactor with the hydrogen-containing gas stream. The vapor effluent can be used as a fuel gas, when the light ends content of this stream is high enough to have fuel value. Another type of effluent stream can include a diesel boiling range product stream, which can advantageously comprise a majority of the processed biocomponent feedstock. The third type of stream can include an aqueous output stream, which can comprise water introduced with the biocomponent feed and/or from steam used to drive the water gas shift reaction. This aqueous stream can also include some level of dissolved organics and other particulate and/or dissolved impurities, which can, in some embodiments, be passed to a waste treatment facility.

In one embodiment, the biocomponent portion of the feedstock can be pretreated to remove impurities prior to hydrotreatment. When desired, this pretreatment can, in some embodiments, occur prior to mixing the biocomponent portion of the feedstock with the mineral oil portion. In such embodiments, the pretreatment can include passing the biocomponent portion through an adsorbent to remove metals, filtering the biocomponent portion to remove sediment, or other processes. Alternately, an optional metals removal pretreatment can take place after mixing of the biocomponent and mineral oil feeds, by exposing the combined feedstock to a demetallization catalyst under demetallization conditions prior to hydrodeoxygenation (and optionally hydrodesulfurization).

In some embodiments, the diesel boiling range product stream can be suitable for incorporation into the diesel fuel pool. Alternately, the diesel boiling range product stream can be subjected to further processing. One type of further processing can include removal of at least a portion of any undesirable heteroatoms (e.g., nitrogen and/or sulfur) remaining in the diesel boiling range product. In the case of sulfur, this can be done using a caustic solution or other wash to remove hydrogen sulfides, or through a sulfur adsorption step, such as by exposing the liquid stream to metallic (massive) Ni, ZnO, or another adsorber of sulfur species, in order to remove mercaptans and/or carbonyl sulfides. Another type of further processing can include recycling of a portion of the product to the inlet of the reactor, e.g., for temperature control. Still another alternative can include stripping the diesel boiling range product of dissolved gases.

Additional hydroprocessing of the diesel boiling range product is also possible. In some embodiments, the diesel boiling range product can be exposed to a hydroisomerization catalyst under effective hydroisomerization conditions. Performing a hydroisomerization process on the diesel boiling range product can improve the cold-flow properties of the product. Advantageously, the hydroisomerization reaction could also simultaneously remove low levels of sulfur and/or oxygen from the diesel boiling range product.

In the optional hydroisomerization stage, the diesel boiling range product can be exposed to one or more reaction zones, optionally present in a separate reactor, that are operated at hydroisomerization conditions in the presence of hydroisomerization catalyst. Generally, catalytic dewaxing can be accomplished by selective hydrocracking or by hydroisomerizing long chain molecules within a feed such as a diesel boiling range feed. Dewaxing catalysts can include, but are not necessarily limited to, molecular sieves such as crystalline aluminosilicates (zeolites) or silicoaluminophosphates (SAPOs). These molecular sieve catalysts may also carry a metal hydrogenation component, such as a Group VIII metal (such as Ni and/or Co, in some preferred embodiments of which the metal hydrogenation component can additionally include a Group VIB metal such as Mo and/or W, preferably at least W), in some cases a Group VIII noble metal (such as Pt and/or Pd). Conditions for hydroisomerization/dewaxing can include temperatures from about 250° C. to about 450° C., preferably from about 280° C. to about 380° C., pressures from about 300 psig to about 3000 psig (about 2.1 MPag to about 20.7 MPag), LHSV values from about 0.1 $hr^{-1}$ to about 5.0 $hr^{-1}$, and treat gas ratios from about 500 scf/bbl to about 5000 scf/bbl (about 84 $Sm^3/m^3$ to about 840 $Sm^3/m^3$).

In various embodiments, the molecular sieve used for catalytic dewaxing can comprise an aluminosilicate, e.g., having an MRE framework zeolite such as ZSM-48, which is a 10-membered ring molecular sieve having a 1-D channel structure. ZSM-48-type molecular sieves can perform dewaxing primarily by isomerizing molecules within the feed. Typical silica to alumina ratios for the aluminosilicate can be from about 250 to 1 or less, or from 200 to 1. Preferably, the silica to alumina ratio of the aluminosilicate can be less than about 110 to 1, for example less than about 110 to about 20 or from about 100 to about 40. To form a catalyst, the molecular sieve can be composited with a binder. Suitable binders can include, but are not limited to silica, alumina, silica-alumina, titania, zirconia, or a mixture thereof. Other suitable binders will be apparent to those of skill in the art.

In a particularly advantageous embodiment, the optional hydroisomerization/dewaxing treatment can improve in the hydroisomerized/dewaxed product one or more of the following: sulfur content (i.e., by lowering it); cetane number; and one or more cold flow properties (such as pour point, cloud point, low-temperature viscosity, and the like).

Another hydroprocessing option can include mixing the diesel boiling range product with a mineral diesel feed and then hydrotreating the mixed feed. This option can be preferred, particularly in cases where initial hydrotreating (e.g., HDO) of the biocomponent feed does not sufficiently lower the heteroatom (e.g., oxygen) content. By removing a majority of the heteroatoms (e.g., oxygen) in the initial hydrotreating (e.g., HDO) stage, suppression of catalytic activity due to the remaining heteroatoms (e.g., oxygen) can be reduced or minimized. Thus, the hydrotreatment stage for the mixed biocomponent and mineral feed can advantageously be a stage where substantial sulfur removal occurs for the mineral feed. Hydrotreatment of the mixed biocomponent and mineral feed can also advantageously produce a diesel boiling range product. This diesel boiling range product can be added to the diesel fuel pool, or it can undergo any of the types of further processing mentioned above.

In embodiments where a mineral feed is mixed with the biocomponent feed prior to a hydrotreatment step, the mineral feed can preferably be a diesel boiling range feed. Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. Suitable diesel boiling range feedstreams can boil within the range of about 215° F. (about 102° C.) to about 800° F. (about 427° C.). Preferably, the diesel boiling range feedstream has an initial boiling point of at least about 250° F. (about 121° C.), or at least about 300° F. (about 149° C.), or at least about 350° F. (about 177° C.), or at least about 400° F. (about 204° C.), or at least about 451° F. (about 233° C.). Preferably, the diesel boiling range feedstream has a final boiling point of about 800° F. (about 427° C.) or less, for example about 775° F. (about 413° F.) or less or about 750° F. (about 399° C.) or less. In an embodiment, the diesel boiling range feedstream has a boiling range from about 451° F. (233° C.) to about 800° F. (427° C.). In another embodiment, the diesel boiling range feedstream also includes kerosene range compounds to provide a feedstream with a boiling range from about 250° F. (121° C.) to about 800° F. (427° C.).

Reaction System

The reactor used for deoxygenating the biocomponent feed can be a hydroprocessing reactor, such as a reactor suitable for performing a hydrotreatment process. The reactor can be configured to operate in a co-current or counter-current manner. If the reactor is configured for counter-current operation, the reactor can be a fixed bed reactor in one embodiment, with the biocomponent feed flowing in the opposite direction relative to both the hydrogen-containing gas flow and, if present, the steam flow. If the reactor is configured for co-current operation, either fixed or fluidized beds may be used.

The reaction system can include several inputs for the reactor. In addition to the biocomponent feedstock, input conduits can also be available for the hydrogen-containing gas and optionally for steam. The input conduit for the hydrogen-containing gas can receive the gas stream from an optional scrubber that can remove at least a portion of the $H_2S$ and at least a portion of the $CO_2$ present in the gas stream. The reaction system can also include a catalyst. If the reactor to is a fixed bed reactor, the reactor may include one or multiple beds of catalyst. The effluent from the reactor can be sent to a separator, e.g., to produce three output streams, including a vapor effluent, an aqueous effluent, and a diesel boiling range product.

Figure 1:
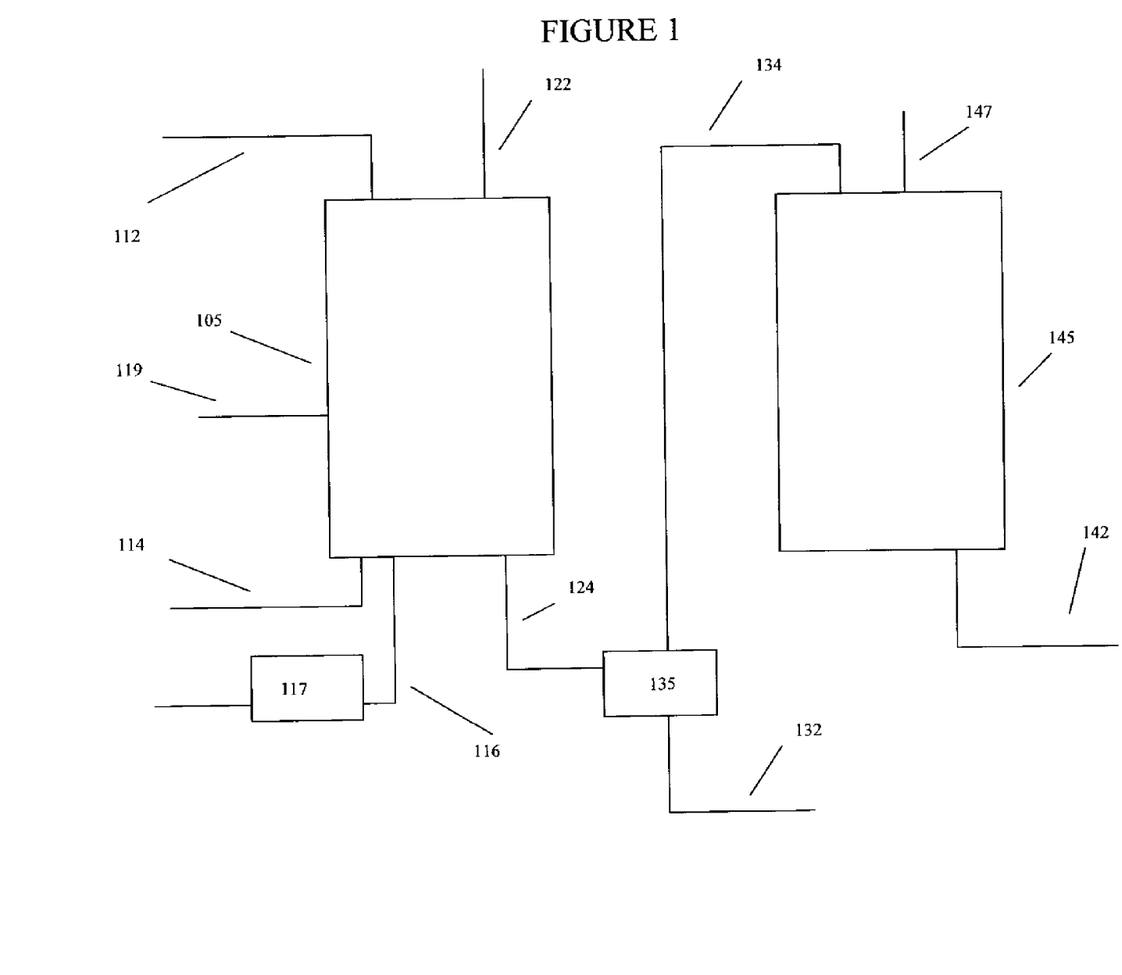
FIG. 1 schematically shows a reaction system for performing a process according to an embodiment of the invention.

A reaction system suitable for performing an embodiment of the invention is schematically shown in FIG. 1. In FIG. 1, reactor 105 has several input conduits. Feed conduit 112 provides a biocomponent feedstock for processing. Steam conduit 114 (optional) can provide steam to reactor 105. Conduit 116 provides to the reactor a hydrogen source comprising a relatively low hydrogen content gas. As needed or desired, the hydrogen-containing gas can pass through scrubber 117 (optional) prior to entering conduit 116 for passage to reactor 105. Based on the arrangement of input feeds, reactor 105 is configured for counter-current operation; however, it will be appreciated that co-current reactor operation can be effected with appropriate rearrangement of the layout in FIG. 1. Optionally, an additional hydrogen feed 119 may be provided to the reactor, e.g., to increase the hydrogen partial pressure as necessary. As shown in FIG. 1, the additional hydrogen feed 119 may be added at an intermediate point in the reactor. However, additional hydrogen can additionally or alternately be introduced through or more proximal to conduit 116 (and/or may be passed through optional scrubber 117), along with other hydrogen and/or other gases.

Products from reactor 105 can exit via one or more conduits. Vapor conduit 122 provides an exit for gases and light products, e.g., that can be sent to a different unit for purification and/or recycled to another portion of the refinery or that can used as fuel gas. Liquid conduit 124 provides an exit for liquid effluent and links to a separator 135, where an aqueous effluent 132 can be separated from a diesel boiling range product 134. Separator 135 can also separate out any remaining gases and/or light products from diesel boiling range product 134. As shown in FIG. 1, diesel boiling range product 134 can be passed into optional hydroisomerization reactor 145. Therein, the diesel boiling range product can be exposed to a hydroisomerization catalyst in the presence of hydrogen from hydrogen input 147 to produce hydroisomerized diesel boiling range product 142.

Figure 2:
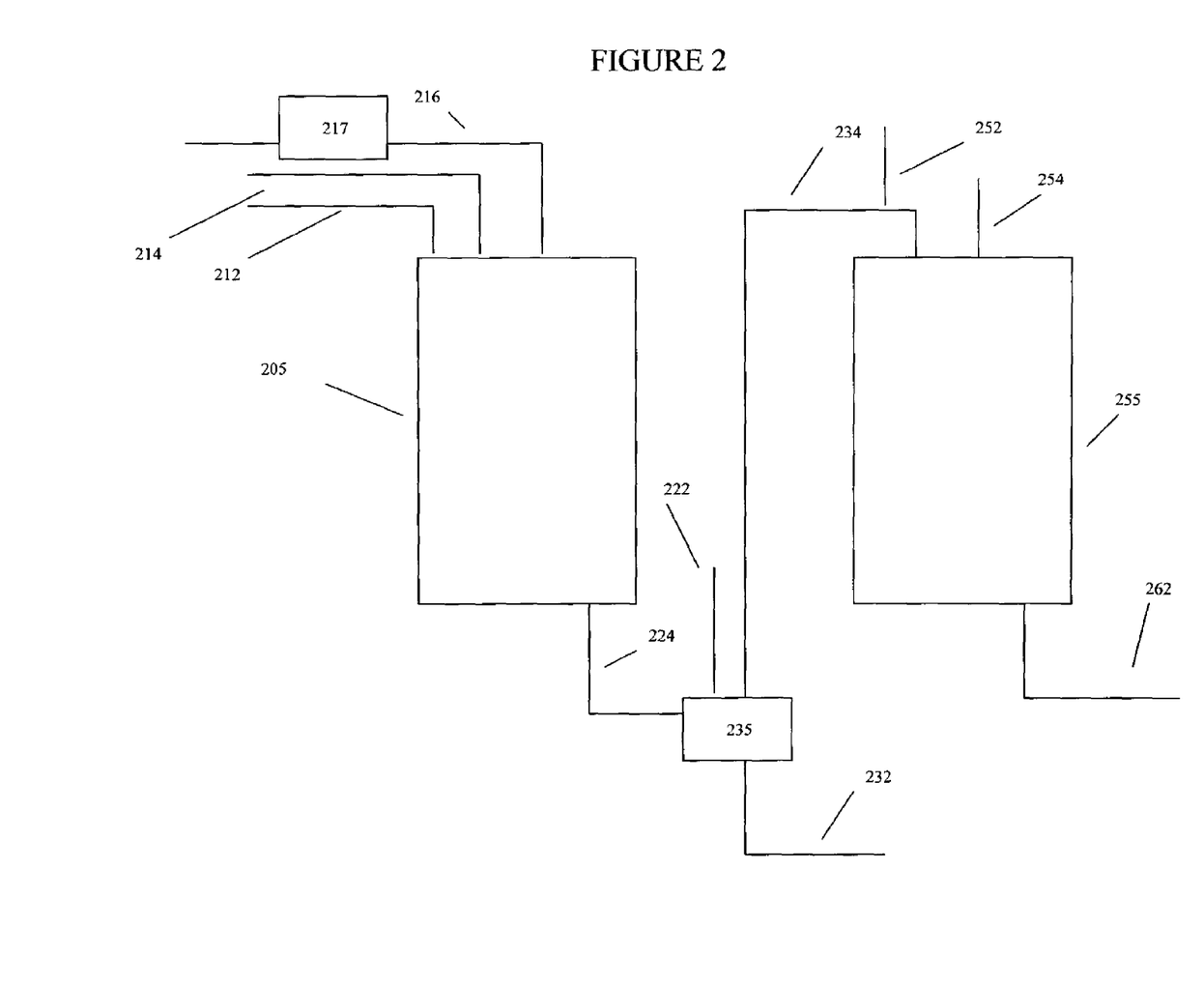
FIG. 2 schematically shows a reaction system for performing a process according to an embodiment of the invention.

Another reaction system suitable for performing an embodiment of the invention is schematically shown in FIG. 2. In FIG. 2, reactor 205 has several input conduits. Feed conduit 212 provides a biocomponent feedstock for processing. Steam conduit 214 (optional) can provide steam to reactor 205. Conduit 216 provides to the reactor a hydrogen source comprising a relatively low hydrogen content gas. As needed or desired, the hydrogen-containing gas can pass through scrubber 217 (optional) prior to entering conduit 216 for passage to reactor 205. Based on the arrangement of input feeds, reactor 205 is configured for co-current operation; however, it will be appreciated that counter-current reactor operation can be effected with appropriate rearrangement of the layout in FIG. 2.

Effluent 224 from reactor 205 can enter separator 235, which can separate out vapor phase product 222 (e.g., that can be sent to a different unit for purification and/or recycled to another portion of the refinery or that can used as fuel gas), an aqueous effluent 232 for waste or further treatment (not shown), and diesel boiling range product 234. As shown in FIG. 2, diesel boiling range product 234 can optionally be mixed with a mineral diesel boiling range feed 252 and can then be passed into second hydrotreatment reactor 255, optionally along with additional hydrogen 254. The mixed feed can be hydrotreated in reactor 255 to produce mixed diesel boiling range product 262. This mixed diesel boiling range product can optionally be passed through a second separator (not shown) to remove contaminant gases, such as $H_2S$, prior to being used directly or added to the diesel fuel pool.

Figure 3:
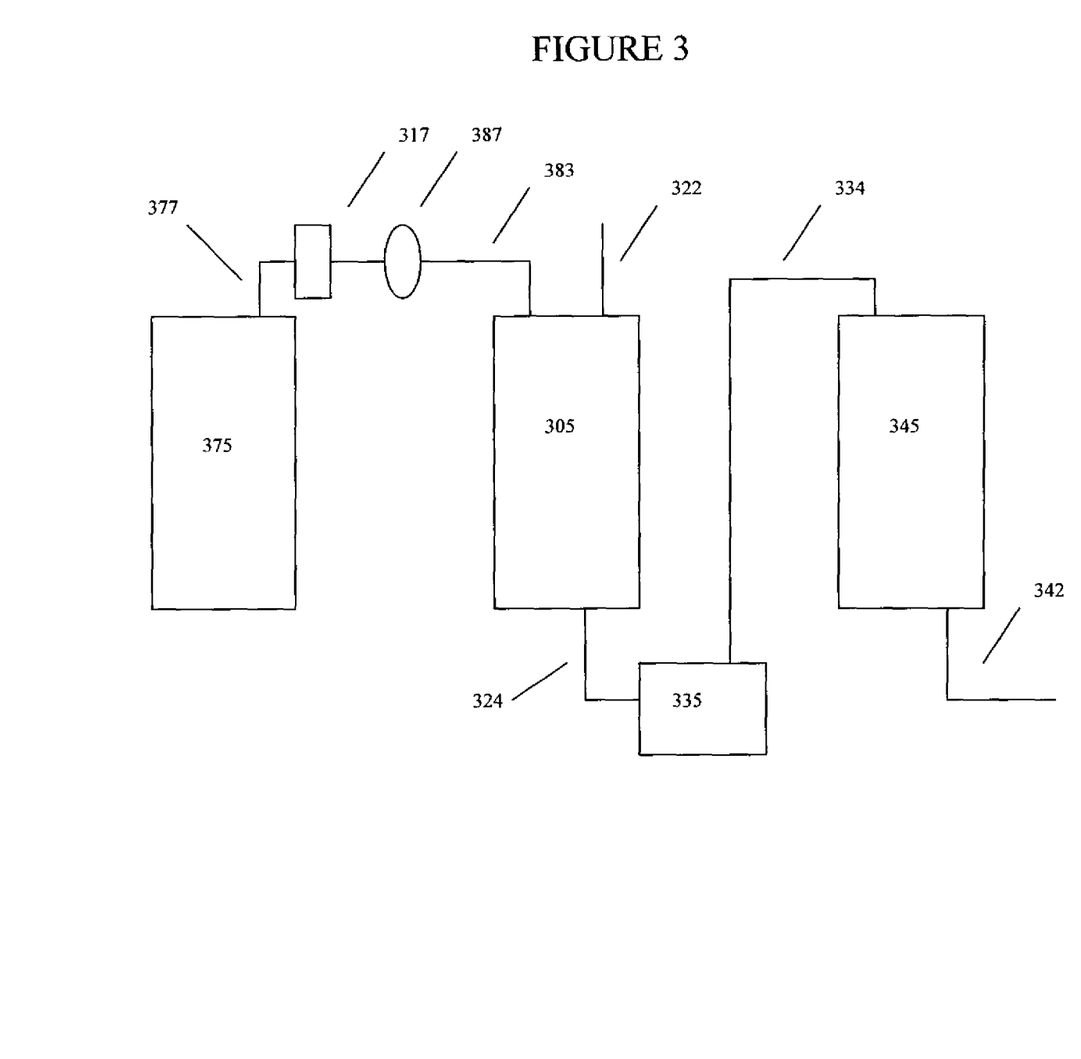
FIG. 3 schematically shows a reaction system for performing a process according to an embodiment of the invention.

FIG. 3 schematically shows the overall integration of a reaction system according to an embodiment of the invention within a refinery. In FIG. 3, the connectivity is shown between a refinery reactor 375 and hydroprocessing reactor 305 for processing a biocomponent feed. Refinery reactor 375, having hydrogen-containing gas exit conduit 377 can represent any refinery reactor from which can emanate a stream containing from about 20 mol % to about 60 mol % hydrogen. The hydrogen-containing gas can pass through conduit 377, optionally through scrubber 317, and into intervening conduit 383. In FIG. 3, an optional pump 387 is also shown, if desired for increasing the pressure of the hydrogen-containing gas flow. Intervening conduit 383 introduces the optionally scrubbed and/or pressurized hydrogen-containing gas flow to hydroprocessing reactor 305. Hydroprocessing reactor 305 also receives biocomponent feed 322, and optionally also steam (not shown). After hydroprocessing, the liquid effluent can be passed to separator 335 via liquid effluent conduit 324. In some embodiments, liquid effluent conduit 324 can also include a vapor effluent, and separator 335 can also separate out this vapor, if present. Separator 335 can also produce a diesel boiling range product 334, which can optionally be passed to another hydroprocessing reactor, such as a hydroisomerization reactor 345. In such situation, the hydroisomerized diesel boiling range product 342 can be used directly or delivered to the diesel fuel pool.

Figure 4:
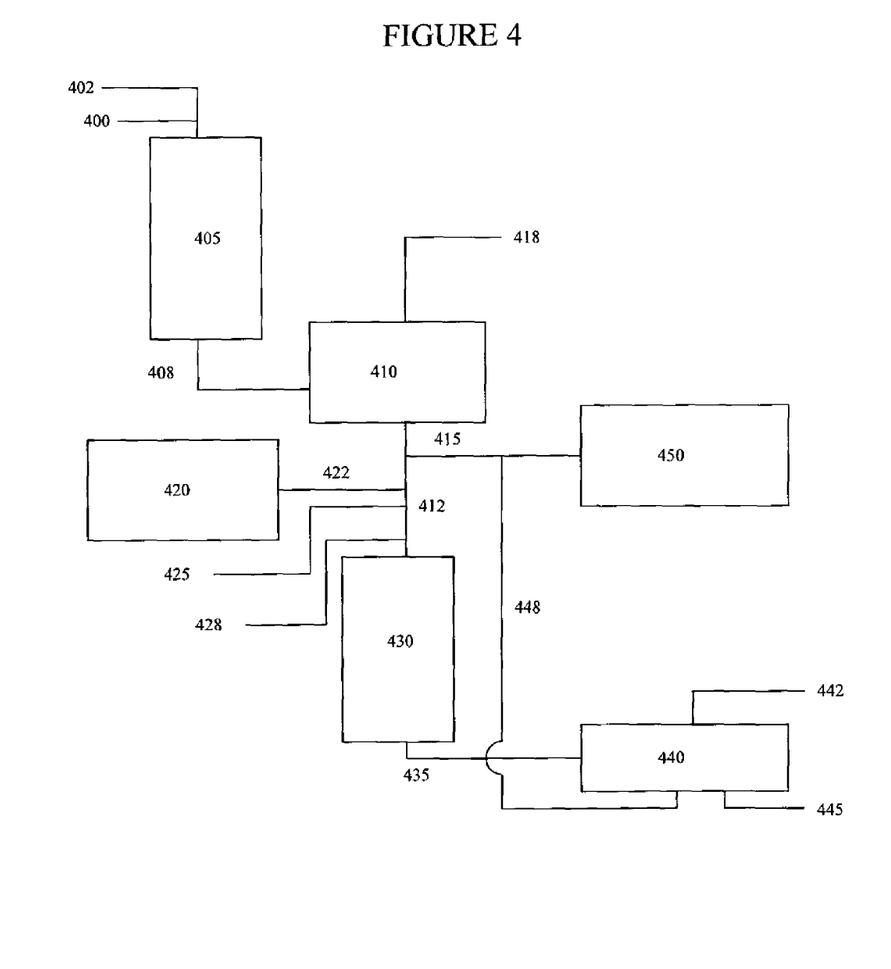
FIG. 4 schematically shows a reaction system for performing a process according to an embodiment of the invention.

FIG. 4 schematically shows an embodiment in which a pre-hydrotreated mineral oil feedstock is mixed with a biocomponent feedstock before undergoing hydrodeoxygenation with a reduced hydrogen content gas and/or a reduced activity catalyst. In FIG. 4, mineral oil feedstock 400 can be fed to hydrotreatment reactor 405, along with hydrogen-containing treat gas 402. While this reactor 405 can be a conventional hydrotreatment reactor, typically using a relatively high activity catalyst for performing hydrodenitrogenation and hydrodesulfurization and typically using conventional treat gas containing a relatively high hydrogen content (i.e., at least 80 mol % or vol % hydrogen, and usually at least 90 mol % or vol % hydrogen, generally with the remainder being relatively inert gas), it can be possible for the catalyst activity to be lower than conventional and/or for the hydrogen content to be lower than conventional. Hydrotreated mineral oil effluent can exit reactor 405 through conduit 408, which leads to separator 410, which may include a single separator or a series of separators, such as relatively higher temperature and relatively lower temperature separators.

It should be appreciated that there may be other inputs to and/or exits from reactor 405, which are not shown in FIG. 4, e.g., an exit for hydrotreatment vapor phase effluent, which can optionally be recycled as a hydrogen-containing gas to reactor 430 and/or can be used in other refinery operations, e.g., as fuel gas. Separator 410 can yield a (liquid phase) hydrotreated mineral oil stream 412 and a vapor phase effluent 418, the hydrogen within which can advantageously be recycled to the treat gas loop, e.g., whence treat gas 402 can originate. In a refinery that processes only mineral oil feeds, hydrotreated mineral oil stream 412 would be directly diverted through conduit 415 into the ADO pool 450. The ADO pool 450 may include a stripper (not shown), if desired. Also, if hydrotreated mineral oil 415 was desired to have further treatment, such as further hydrotreatment, dewaxing, or the like (not shown), that can additionally or alternately be undertaken before proceeding to ADO pool 450.

However, in embodiments where mineral oil and biocomponent feedstocks are to be co-processed, all or a portion of hydrotreated mineral oil stream 412 can pass instead to hydrodeoxygenation reactor 430. The biocomponent feedstock 422 from tank 420 (which can represent a storage tank or an unnamed source of biocomponent feedstock) can be mixed with hydrotreated mineral oil stream 412. Also, hydrogen-containing gas 425, preferably containing relatively low hydrogen content, such as from about 20 mol % to about 60 mol % hydrogen, e.g., from a refinery stream purge gas or off-gas, can be added. Other optional additions can be made through line 428, e.g., steam, additional hydrogen, mineral oil feed that had not been pre-hydrotreated, or the like, or combinations thereof. In FIG. 4, these additions to the hydrotreated mineral oil stream 412 are shown as occurring prior to entering the reactor 430, but it is envisioned that this mixing could additionally or alternately occur within the reactor 430. Similarly to reactor 405, it should be appreciated that there may be other inputs to and/or exits from hydrotreatment reactor 430, which are not shown in FIG. 4, e.g., an exit for hydrotreatment vapor phase effluent, which can optionally be recycled as a hydrogen-containing gas to reactor 430 and/or can be used in other refinery operations, e.g., as fuel gas.

The (liquid phase) hydrotreated mixed mineral and biocomponent effluent 435 from reactor 430, like stream 408, can be further processed using separator 440. Separator 440 can yield a (liquid phase) hydrotreated renewable diesel boiling stream 448, a vapor phase effluent 442, and optionally a sour water stream 445. If the hydrogen content in vapor phase effluent 442 is high enough, the effluent 442 can be recycled as a hydrogen-containing gas to reactor 430, and/or the effluent 442 can be used in other refinery operations, e.g., as fuel gas. Sour water stream 445, when present, can be sent for further processing or to waste (not shown). Renewable diesel boiling stream 448 can advantageously be sent to ADO pool 450, optionally being combined with any portion of the pre-hydrotreated mineral oil stream 415 not mixed with biocomponent feedstock via 422. Also, if renewable diesel boiling stream 448 was desired to have further treatment, such as further hydrotreatment, dewaxing, or the like (not shown), that can additionally or alternately be undertaken before proceeding to ADO pool 450.

Figure 5:
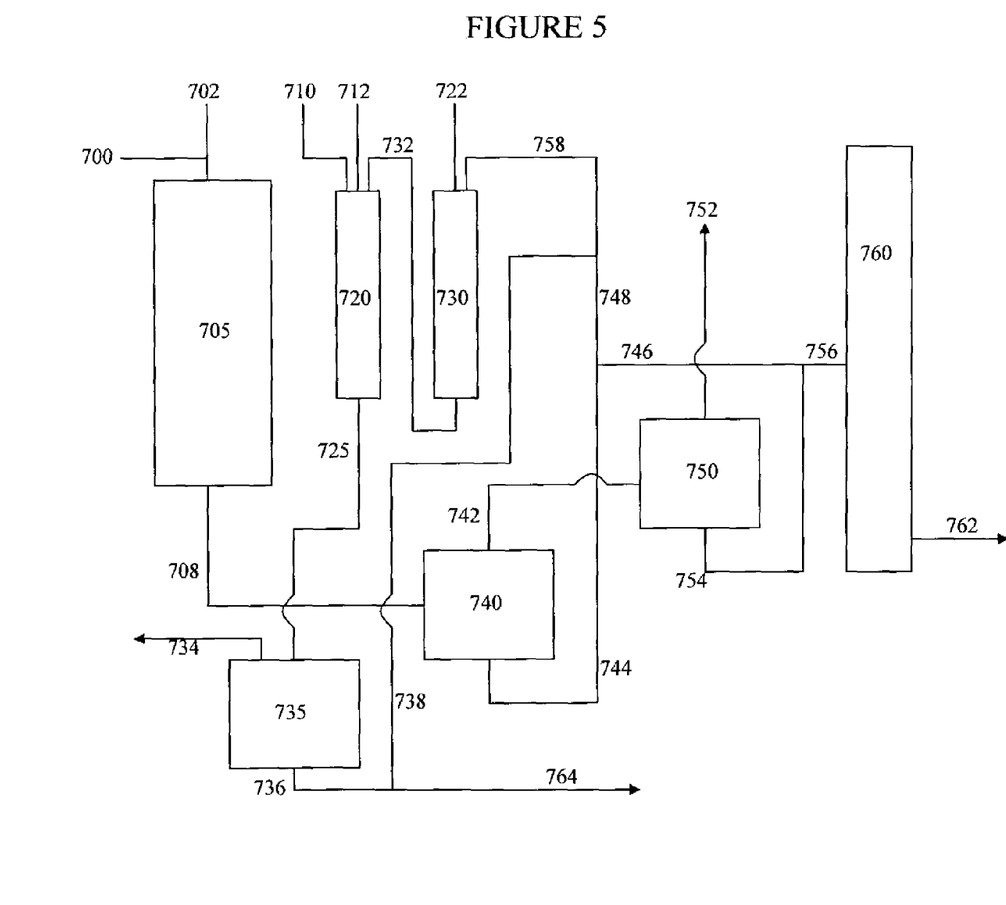
FIG. 5 schematically shows a reaction system for performing a process according to an embodiment of the invention.

FIG. 5 schematically shows an embodiment in which a mineral oil feedstock can be hydrotreated in parallel with a biocomponent feedstock being hydrodeoxygenated with in the presence of a reduced activity catalyst. In FIG. 5, hydrodeoxygenation reactor 720 contains a hydrodeoxygenation catalyst (e.g., a water gas shift catalyst and/or an at least partially spent catalyst having a hydrodeoxygenation activity, such as spent hydrotreating catalyst) and has several input conduits. Feed conduit 710 provides a fresh biocomponent feedstock for processing. Steam conduit (not shown, optional) can provide steam to reactor 720, if desired. Conduit 712 provides to the reactor a hydrogen source comprising a relatively low hydrogen content gas (e.g., via use of a relatively low value refinery stream, such as containing from about 20 mol % to about 60 mol % hydrogen). Recycle conduit 732 can also provide an additional hydrocarbon feed. Based on the arrangement of input feeds, reactor 720 is configured for co-current operation; however, it will be appreciated that counter-current reactor operation can be effected with appropriate rearrangement of the inputs, such as into reactor 105 of FIG. 1. Hydrodeoxygenated product from reactor 720 can exit via conduit 725.

As shown in FIG. 5, in parallel, mineral feedstock 700 can enter hydrotreatment reactor 705 for catalytic hydroprocessing using a hydrotreating catalyst (e.g., a bulk and/or supported catalyst containing Group VIII/Group VIB metals and typically sulfided, such as a NiMo, a CoMo, and/or a NiMoW catalyst). Steam conduit (not shown, optional) can provide steam to reactor 705, if desired. Conduit 702 provides to the reactor a hydrogen source, generally comprising a relatively pure hydrogen content gas (e.g., at least about 80 mol % hydrogen, such as at least 95 mol % hydrogen). Based on the arrangement of input feeds, reactor 705 is configured for co-current operation; however, it will be appreciated that counter-current reactor operation can be effected with appropriate rearrangement of the inputs, such as into reactor 105 of FIG. 1. Hydrotreated product from reactor 705 can exit via conduit 708.

While it should be appreciated by one of ordinary skill in the art that the hydrotreated product in conduit 708 and the hydrodeoxygenated product in conduit 725 can be combined to undergo a combined separation, FIG. 5 shows that these streams can be separated individually. One reason for individualizing the separations of these products can be the enhanced corrosive nature (e.g., linked to the carbon oxide, or specifically $CO_2$, content) of the hydrodeoxygenated product in conduit 725, relative to the hydrotreated product in conduit 708.

In FIG. 5, hydrodeoxygenated product in conduit 725 can be sent to a (hot) biocomponent separator drum 735 to obtain a (hot) biocomponent vapor phase component that can exit through conduit 734, optionally a (hot) biocomponent aqueous phase (not shown), and a (hot) biocomponent liquid phase component that can exit through conduit 736. At least a portion of the separated liquid phase component can advantageously be recycled through conduit 738. This recycle first goes through a hydroisomerization reactor 730, which contains a hydroisomerization catalyst (e.g., a zeolite-supported catalyst containing a noble Group VIII metal or a non-noble Group VIII metal and a Group VIB metal, generally sulfided, such as a Pt- and/or Pd-promoted zeolite Y dewaxing catalyst, a Pt-promoted ZSM-48 dewaxing catalyst, and/or a NiW-promoted ZSM-48 dewaxing catalyst) and is fed with a hydrogen source 722. Recycling the dewaxed/isomerized product through conduit 732 can allow a feed to be further hydrodeoxygenated, to have advantageously better cold-flow properties (e.g., lower relative cloud point, lower relative pour point, lower relative cold filter plugging point, or the like, or a combination thereof) for managing the tendency of hydrodeoxygenated biocomponent products to have relatively poor (e.g., off-spec high) cold-flow properties, and/or to act as a diluent to manage the large exotherms common in biocomponent hydrodeoxygenation reactions. Optionally but preferably, another portion of the separated liquid phase component, which has sufficiently low oxygen, nitrogen, and sulfur content, can be sent to the fuel pool, e.g., as diesel fuel, through conduit 764. Though not pictured this way in FIG. 5, this other portion of the separated liquid phase component may not have sufficiently low heteroatom levels, in which case it can optionally first be sent to stripper 760 before being directed to the fuel pool through conduit 762.

In FIG. 5, hydrotreated product in conduit 708 can be sent to a hot mineral separator drum 740 to obtain a hot mineral vapor phase component that can exit through conduit 742, optionally a hot mineral aqueous phase (not shown), and a hot mineral liquid phase component that can exit through conduit 744. At least a portion of the separated liquid phase component can advantageously be recycled through conduit 748, where it can be combined with the separated liquid phase component from the (hot) biocomponent separator in conduit 738 to form combined liquid phase component in conduit 758 for recycle via hydroisomerization reactor 730. Optionally but preferably, another portion of the separated hot liquid phase component, which has sufficiently low oxygen, nitrogen, and sulfur content, can be sent to the fuel pool, e.g., as diesel fuel, through conduit 762. Though not pictured this way in FIG. 5, this other portion of the separated liquid phase component may not have sufficiently low heteroatom levels, in which case it can optionally first be sent to stripper 660 before being directed to the fuel pool through conduit 762. In FIG. 5, however, this other portion of the separated hot liquid phase component may not have sufficiently low heteroatom levels, in which case it is optionally but preferably first sent through conduit 746 to stripper 760 before being directed to the fuel pool through conduit 762.

While it is shown in FIG. 5 that hydrogen sources 702, 712, and 722 for reactors 705, 720, and 730, respectively, are independent, two or more can instead be drawn from the same source. For example, hydrogen sources 702 and 722 can comprise a relatively pure hydrogen source, e.g., from a refinery distribution network hydrogen source. Alternately, though less preferably, one or both of hydrogen sources 702 and 722 can, in addition to hydrogen source 712, originate from a (re-)use of a relatively low value refinery stream having a hydrogen content from about 20 mol % to about 60 mol % hydrogen.

FIG. 5 shows the mineral vapor phase component that exits hot mineral separator drum 740 through conduit 742 being directed to a cold separator drum 750, which itself can create a cold vapor phase component that can exit through conduit 752, optionally a cold aqueous phase (not shown), and a cold liquid phase component that can exit through conduit 754. A portion (though none in FIG. 5) of the cold separated liquid phase component, which has sufficiently low oxygen, nitrogen, and sulfur content, can be sent to the fuel pool, e.g., as diesel fuel, through conduit 762. As with the hot separated mineral liquid phase component, in FIG. 5, the cold separated liquid phase component may not have sufficiently low heteroatom levels, in which case it is optionally but preferably first sent through conduit 756 (where it is combined with the hot separated mineral liquid phase component from conduit 746) to stripper 760 before being directed to the fuel pool through conduit 762.

The biocomponent (hot) vapor phase component in conduit 734 and the cold vapor phase component in conduit 752, independently or collectively can be: sent to flare; used as fuel gas; purified to isolate one or more higher value components (such as hydrogen) therefrom; recycled and/or cascaded to the hydrodeoxygenation reactor 720, the hydrotreatment reactor 705, the hydroisomerization reactor 730, and/or another refinery process needing hydrogen or another gaseous component; or the like; or some combination thereof. Although FIG. 5 shows a three-stage separation using (hot) biocomponent separator drum 735, hot mineral separator drum 740, and cold separator drum 750, it is of course contemplated that more than three separation stages may be used, or alternatively that less than three separation stages may be used. In one alternative embodiment, where there is only (hot) biocomponent separator drum 735 and hot mineral separator drum 740, the vapor phase component 742 from sole mineral separator drum 740 can be disposed of as detailed for biocomponent (hot) vapor phase component in conduit 734 and/or cold vapor phase component in conduit 752 above, with cold separator 750 and conduits 752 and 754 being removed from FIG. 5.

Furthermore, though the (hot) biocomponent liquid phase recycle portion and the hot mineral liquid phase recycle portion are shown in FIG. 5 as being individually linked into the recycle conduit upstream/downstream from each other and as being separated from the portion (hot) biocomponent and hot mineral liquid phase portions, respectively, that are being sent to the fuel pool, it should be understood that the streams may be combined in the recycle conduit in any order or together and that the streams may additionally or alternatively be combined to be sent to the fuel pool, optionally through stripper 760 as needed.

Additional Embodiments

The following embodiments can additionally or alternatively be is included in the invention as follows.

Embodiment 1. A method for hydroprocessing a biocomponent feedstock to form a diesel boiling range product, comprising: treating a purge gas and/or an off-gas stream from an existing refinery reactor to remove hydrogen sulfide and carbon dioxide, the treated refinery stream having a hydrogen content from about 20 mol % to about 60 mol %, for example from about 25 mol % to about 50 mol %; and hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

Embodiment 2. A method for hydroprocessing a biocomponent feedstock to form a diesel boiling range product, comprising: treating a purge gas and/or an off-gas stream from an existing refinery reactor to remove hydrogen sulfide and carbon dioxide, the treated refinery stream having a hydrogen content from about 25 wt % to about 50 wt %; and hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

Embodiment 3. The method of embodiment 1 or embodiment 2, wherein the catalyst is a water gas shift catalyst.

Embodiment 4. The method of embodiment 3, wherein the water gas shift catalyst comprises an oxide of iron, copper, zinc, chromium, or a combination thereof.

Embodiment 5. The method of embodiment 4, wherein the water gas shift catalyst comprises $Fe_3O_4$.

Embodiment 6. The method of any one of the previous embodiments, wherein the feedstock is substantially free of sulfur.

Embodiment 7. The method of any one of the previous embodiments, wherein the treated refinery gas stream is substantially free of sulfur.

Embodiment 8. The method of any one of the previous embodiments, wherein the catalyst comprises a spent and/or regenerated hydrotreating catalyst.

Embodiment 9. The method of embodiment 8, wherein the spent and/or regenerated hydrotreating catalyst comprises at least one metal from Group VIB of the Periodic Table of Elements and at least one metal from Group VIII of the Periodic Table of Elements.

Embodiment 10. The method of embodiment 9, wherein the spent and/or regenerated hydrotreating catalyst comprises Ni and/or Co and comprises Mo and/or W.

Embodiment 11. The method of any one of the previous embodiments, wherein the effective hydroprocessing conditions include an LHSV from about 0.5 $hr^{-1}$ to 1.5 $hr^{-1}$, a temperature from about 600° F. to about 650° F. (about 316° C. to about 343° C.), and a hydrogen partial pressure from about 10 psig to about 200 psig (about 69 kPag to about 1.4 MPag).

Embodiment 12. The method of embodiment 11, wherein the to hydrogen partial pressure is at least about 40 psig (about 280 kPag).

Embodiment 13. The method of any one of the previous embodiments, wherein the biocomponent portion is reacted in the presence of an additional hydrogen-containing stream.

Embodiment 14. The method of any one of the previous embodiments, wherein hydroprocessing the feedstock comprises introducing the feedstock into the reactor in a countercurrent manner relative to the treated refinery stream.

Embodiment 15. The method of any one of the previous embodiments, wherein the vapor effluent is used as a refinery fuel gas.

Embodiment 16. The method of any one of the previous embodiments, further comprising hydroisomerizing the diesel boiling range product.

Embodiment 17. The method of embodiment 16, wherein the hydroisomerization catalyst comprises a molecular sieve having a $SiO_2:Al_2O_3$ ratio of 100 or less, for example 80 or less or 60 or less, and a metal oxide binder, and the dewaxing catalyst has a ratio of zeolite surface area to external surface area of at least 80:100, for example at least 90:100 or at least 105:100.

Embodiment 18. The method of embodiment 17, wherein one or more of the following are satisfied: the molecular sieve is EU-1, zeolite beta, ZSM-35, ZSM-11, ZSM-57, NU-87, ZSM-22, EU-2, EU-11, ZBM-30, ZSM-48, ZSM-23, or a combination thereof, preferably zeolite beta, ZSM-48, and/or ZSM-23, more preferably ZSM-48 and/or ZSM-23; the metal oxide binder in powder form has a surface area of 100 $m^2/g$ or less, for example 80 $m^2/g$ or less or 60 $m^2/g$ or less; the metal oxide binder comprises at least one of silica, alumina, titania, and zirconia; and the hydroisomerization catalyst also comprises a promoter metal selected from the metals of Group VIII of the Periodic Table of Elements, preferably Ni, Pt, and/or Pd.

Embodiment 19. The method of any one of the previous embodiments, further comprising mixing the diesel boiling range product with a mineral feed and hydrotreating the mixed feed under effective hydrotreating conditions.

EXAMPLES

Example 1

A mineral ADO is hydrotreated to yield a product suitable for use in the diesel fuel pool, having a finished sulfur content of about 3 wppm or less and a finished nitrogen content of about 2 wppm or less, and exhibiting an API gravity of about 34.9 (degrees). About 70 wt % of this hydrotreated mineral ADO is added to about 30 wt % soybean oil to form a mixed feed. This mixed feed is contacted in a hydroprocessing reactor with a treat gas comprising about 40 mol % hydrogen and about 60 mol % methane in the presence of a commercial supported (alumina) NiMo hydrotreating catalyst at a temperature of about 625° F. (about 329° C.) and at a total reactor pressure of about 200 psig (about 1.4 MPag). The hydrotreating catalyst is not fresh and has been previously used to hydrotreat vacuum gas oils (VGO) to the extent that the catalyst has about a 10% activity reduction, as compared to fresh catalyst of identical composition. The treat gas is introduced at a rate of about 2250 scf/bbl (about 380 $Sm^3/m^3$). This corresponds to an equivalent hydrogen treat gas rate of about 900 scf/bbl (about 150 $Sm^3/m^3$) and a hydrogen partial pressure of about 60-80 psig (about 410-550 kPag). The hydroprocessing reactor has an LHSV of about 1.0 $hr^{-1}$.

The hydrotreated mixed feed yields about 95 wt % recovery, based on the original mixed feed plus hydrogen-containing treat gas, and exhibits an API gravity of about 42.2 (degrees). This represents an improvement in API of more than about 20%. Significant water, CO, and $CO_2$ are formed during the reaction, and some naphtha is also made (which can be sent to the gasoline pool, if desired, or can be recycled to another refinery process). At least about 90% of the oxygen from the biocomponent portion of the mixed feed is removed by this process.

Examples 2-4

A mixed feedstock, containing about 30 wt % of a biocomponent feed (soybean oil) and about 70 wt % of a mineral feed (bottoms from a hydrocracking unit), as described in Table 1 below, was hydrodeoxygenated in a pilot unit comprising a ~100 $cm^3$ HDO reactor loaded with an activated catalyst based on a commercially available supported NiMo catalyst. The HDO catalyst was activated using a DMDS spiked light gasoil. The HDO reactor EIT was thereafter brought to about 625° F. (about 329° C.), and the unit pressure was brought to between about 150 psig (about 1.0 MPag) and about 200 psig (about 1.4 MPag). This HDO reactor was run using a relatively low hydrogen content treat gas (~40 mol % $H_2$, with the remainder being methane) at a treat gas rate of about 2250 scf/bbl (about 380 $Nm^3/m^3$), which corresponds to a hydrogen partial treat gas rate of about 900 scf/bbl (about 150 $Nm^3/m^3$). The feed was run through the unit at an LHSV of between about 1.0 $hr^{-1}$ and about 1.3 $hr^{-1}$.

TABLE 1

| Base Feed | Mineral feed | Biocomponent feed | Mixed feed |
|---|---|---|---|
| Soybean Oil Content | — | 100 wt % | 30 wt % |
| Mineral Oil Content | 100 wt % | — | 70 wt % |
| API gravity | 40.4 | 21.7 | 34.9 |
| Sulfur, wppm | 0.35 | <0.3 | — |
| Nitrogen, wppm | <0.2 | 14 | — |
| Bromine # | — | 62.8 | ~19 |
| IBP, ° F. | 295 | — | 178 |
| T5, ° F. | 352 | — | 362 |
| T10, ° F. | 380 | — | 395 |
| T20, ° F. | 417 | — | 436 |
| T30, ° F. | 442 | — | 469 |
| T40, ° F. | 466 | — | 509 |
| T50, ° F. | 493 | — | 560 |
| T60, ° F. | 528 | — | 612 |
| T70, ° F. | 566 | — | 690 |
| T80, ° F. | 600 | — | 1111 |
| T90, ° F. | 655 | — | 1125 |
| T95, ° F. | 689 | — | 1127 |
| T99.5, ° F. | 763 | — | 1133 |
| 1-Ring Aromatics | 15.5 wt % | — | 10.8 wt % |
| 2-Ring Aromatics | 1.3 wt % | — | 1.0 wt % |
| 3-Ring Aromatics | 0.1 wt % | — | 0.2 wt % |
| Total Aromatics | 17.0 wt % | — | 11.9 wt % |
| $H_2$ Content, mass % | 13.9 | — | — |

Each sample was run for at least three days on oil and the liquid and vapor products were periodically sampled. After about three days, the products had the following properties as listed in Table 2.

TABLE 2

| | Example 2 | Example 3 | Example 4 |
|---|---|---|---|
| EIT, ° F. | 625 | 625 | 615 |
| Total pressure, psig | 200 | 150 | 150 |
| LHSV, $hr^{-1}$ | 1.0 | 1.0 | 1.3 |
| $H_2$ purity, mol % | 40 | 40 | 40 |
| Treat gas rate, scf/bbl | 2250 | 2250 | 2250 |
| CO in exit gas, mol % | 1.8 | 2.2 | 2.5 |
| $CO_2$ in exit gas, mol % | 2.9 | 2.6 | 2.3 |
| CO yield on soy oil, wt % | 5.6 | 3.9 | 4.5 |
| $CO_2$ yield on soy oil, wt % | 8.0 | 7.2 | 6.4 |
| $H_2$ Consumption, scf/bbl (calc.) | 1327 | 1346 | 1334 |
| ASTM Color | L2.0 | L3.0 | 3.0 |
| API Gravity, ° | 42.2 | 42.1 | 42.4 |
| Soy Oil Derived Content | | | |
| $C_{12}$ content, mass % | 1.2 | 2.6 | 2.2 |
| $C_{13}$ content, mass % | 2.5 | 3.2 | 2.3 |
| $C_{14}$ content, mass % | 1.5 | 0.8 | 1.0 |
| $C_{15}$ content, mass % | 9.3 | 9.7 | 8.2 |
| $C_{16}$ content, mass % | 2.3 | 3.8 | 3.7 |
| $C_{17}$ content, mass % | 55.7 | 55.6 | 56.3 |
| $C_{18}$ content, mass % | 13.4 | 13.8 | 19.0 |
| $C_{19}$ content, mass % | 1.1 | 1.6 | 1.7 |
| $C_{20}$ content, mass % | 3.6 | 3.9 | 2.5 |
| $C_{21}$ content, mass % | 2.5 | 2.3 | 1.4 |
| $C_{22}$ content, mass % | 1.3 | 1.3 | 0.7 |
| $C_{23}$ content, mass % | 1.3 | 0.5 | 0.1 |
| $C_{24}^+$ content, mass % | 4.4 | 1.0 | 0.8 |
| Oxygenate content, mass % | 0.0 | 0.0 | 0.0 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for hydroprocessing a biocomponent feedstock to form a diesel boiling range product, comprising:
   treating a purge gas and/or an off-gas stream from an existing refinery reactor to remove hydrogen sulfide and carbon dioxide, the treated refinery stream having a hydrogen content from about 20 mol % to about 60 mol %; and
   hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

2. The method of claim 1, wherein the catalyst is a water gas shift catalyst.

3. The method of claim 2, wherein the water gas shift catalyst comprises an oxide of iron, copper, zinc, chromium, or a combination thereof.

4. The method of claim 3, wherein the water gas shift catalyst comprises $Fe_3O_4$.

5. The method of claim 2, wherein the feedstock is substantially free of sulfur.

6. The method of claim 2, wherein the treated refinery stream is substantially free of sulfur.

7. The method of claim 1, wherein the catalyst comprises a spent and/or regenerated hydrotreating catalyst.

8. The method of claim 7, wherein the spent and/or regenerated hydrotreating catalyst comprises at least one metal from Group VIB of the Periodic Table of Elements and at least one metal from Group VIII of the Periodic Table of Elements.

9. The method of claim 8, wherein the spent and/or regenerated hydrotreating catalyst comprises Ni and/or Co and comprises Mo and/or W.

10. The method of claim 1, wherein the effective hydroprocessing conditions include an LHSV from about 0.5 $hr^{-1}$ to 1.5 $hr^{-1}$, a temperature from about 600° F. to about 650° F. (about 316° C. to about 343° C.), and a hydrogen partial pressure from about 10 psig to about 200 psig (about 69 kPag to about 1.4 MPag).

11. The method of claim 10, wherein the hydrogen partial pressure is at least about 40 psig (about 280 kPag).

12. The method of claim 11, wherein the biocomponent portion is reacted in the presence of an additional hydrogen-containing stream.

13. The method of claim 1, wherein hydroprocessing the feedstock comprises introducing the feedstock into the reactor in a counter-current manner relative to the treated refinery stream.

14. The method of claim 1, wherein the vapor effluent is used as a refinery fuel gas.

15. The method of claim 1, further comprising hydroisomerizing the diesel boiling range product.

16. The method of claim 15, wherein the hydroisomerization catalyst comprises a molecular sieve having a $SiO_2$:$Al_2O_3$ ratio of 100 or less, and a metal oxide binder, and the dewaxing catalyst has a ratio of zeolite surface area to external surface area of at least 80:100.

17. The method of claim 16, wherein one or more of the following are satisfied:
   the molecular sieve is EU-1, zeolite beta, ZSM-35, ZSM-11, ZSM-57, NU-87, ZSM-22, EU-2, EU-11, ZBM-30, ZSM-48, ZSM-23, or a combination thereof;
   the metal oxide binder in powder form has a surface area of 100 $m^2/g$ or less;
   the metal oxide binder comprises at least one of silica, alumina, titania, and zirconia; and
   the hydroisomerization catalyst also comprises a promoter metal selected from the metals of Group VIII of the Periodic Table of Elements.

18. The method of claim 1, further comprising mixing the diesel boiling range product with a mineral feed and hydrotreating the mixed feed under effective hydrotreating conditions.

19. A method for hydroprocessing a biocomponent feedstock to form a diesel boiling range product, comprising:
   treating a purge gas and/or an off-gas stream from an existing refinery reactor to remove hydrogen sulfide and carbon dioxide, the treated refinery stream having a hydrogen content from about 25 wt % to about 50 wt %; and
   hydroprocessing a feedstock comprising a biocomponent portion in a reactor in the presence of the treated refinery stream, a catalyst with hydrogenation activity, and optionally steam under effective hydroprocessing conditions to produce a vapor effluent, an aqueous effluent, and the diesel boiling range product.

* * * * *